US007281310B2

(12) United States Patent
Moore et al.

(10) Patent No.: US 7,281,310 B2
(45) Date of Patent: Oct. 16, 2007

(54) BALUSTER DRIVER TOOL AND METHOD OF USING SAME

(75) Inventors: Daniel L. Moore, New Philadelphia, OH (US); Terry D. Burrell, Dover, OH (US)

(73) Assignee: L.J. Smith, Inc., Bowerston, OH (US)

( * ) Notice: Subject to any disclaimer, the term of this patent is extended or adjusted under 35 U.S.C. 154(b) by 399 days.

(21) Appl. No.: 10/869,742

(22) Filed: Jun. 16, 2004

(65) Prior Publication Data

US 2005/0278926 A1 Dec. 22, 2005

(51) Int. Cl.
*B23P 19/06* (2006.01)
*B25B 13/06* (2006.01)

(52) U.S. Cl. ......................... 29/456; 81/124.6; 81/125; 81/177.85; 81/438

(58) Field of Classification Search .................. 29/456; 81/121.1, 124.6, 125, 177.85, 438, 439
See application file for complete search history.

(56) References Cited

U.S. PATENT DOCUMENTS 1,693,304 A * 11/1928 Marthey .................... 81/121.1
1,864,466 A * 6/1932 Peterson ..................... 403/365
2,010,616 A * 8/1935 Walsh ....................... 173/93.7
2,474,360 A * 6/1949 Jimerson .................... 403/328
2,743,637 A * 5/1956 Redmon ...................... 81/476
4,352,485 A 10/1982 Basey
4,386,761 A 6/1983 Kato
4,403,767 A 9/1983 Basey
4,436,005 A * 3/1984 Hanson ................... 81/177.75
4,505,456 A 3/1985 Zieg
4,533,121 A 8/1985 Basey
4,750,750 A * 6/1988 Batalorf, Jr. ................ 279/144
4,809,955 A 3/1989 Veilleux
4,993,289 A * 2/1991 Parks ........................ 81/124.6
5,018,988 A * 5/1991 Kibblewhite et al. ....... 439/577
5,050,467 A * 9/1991 Brown et al. ................. 81/466
5,485,769 A * 1/1996 Olson et al. ............. 81/177.85
5,557,893 A 9/1996 Bowls
5,568,757 A * 10/1996 Lewis ....................... 81/177.2
5,676,013 A 10/1997 Kahlau
5,701,236 A 12/1997 Viviano
5,782,570 A * 7/1998 Masterson et al. ............ 403/13

(Continued)

FOREIGN PATENT DOCUMENTS

JP 10309676 A * 11/1998

*Primary Examiner*—Essama Omgba
(74) *Attorney, Agent, or Firm*—Sand & Sebolt

(57) ABSTRACT

A baluster driver tool for rotating a baluster to threadably secure it to a support. The driver tool includes a housing having a connector at one end for connecting it to a drill and a baluster-engaging member at the opposite end for receiving the baluster. The baluster-engaging member includes a cavity that is complementary sized and shaped to receive an end of the baluster. When the drill is activated, the housing rotates about its longitudinal axis causing the baluster to rotate in unison with the housing and securing a threaded end of the baluster into the support. In a second embodiment, a smooth tapered end of a baluster is received within a threaded tapered cavity in the housing. The threads secure the smooth tapered end of the baluster within the cavity so that rotation of the housing causes the baluster to rotate in unison therewith and securing the threaded end of the baluster to the support.

20 Claims, 14 Drawing Sheets

U.S. PATENT DOCUMENTS

| | | | | |
|---|---|---|---|---|
| 5,960,681 | A * | 10/1999 | Anderson et al. | 81/125 |
| 6,240,813 | B1 * | 6/2001 | Hyatt | 81/124.6 |
| 6,295,896 | B1 * | 10/2001 | I-He | 81/63 |
| 6,354,176 | B1 * | 3/2002 | Nordlin | 81/124.4 |
| 6,568,145 | B2 | 5/2003 | Bartel | |
| 6,581,896 | B1 | 6/2003 | Olexovitch | |
| 6,626,071 | B2 * | 9/2003 | Kesinger et al. | 81/437 |
| 6,701,809 | B2 * | 3/2004 | Huang | 81/125 |
| 6,978,702 | B1 * | 12/2005 | Diggle et al. | 81/124.4 |
| 7,028,589 | B1 * | 4/2006 | Cheng | 81/177.85 |
| 7,077,033 | B2 * | 7/2006 | Hirakata | 81/124.6 |
| 2005/0193872 | A1 * | 9/2005 | Wyman | 81/64 |
| 2006/0169108 | A1 * | 8/2006 | Boone | 81/121.1 |

* cited by examiner

FIG−12

BALUSTER DRIVER TOOL AND METHOD OF USING SAME

BACKGROUND OF THE INVENTION

1. Technical Field

This invention generally relates to woodworking tools. More particularly, the invention relates to a tool for installing balusters and to a method of using the tool. Specifically, the invention relates to a baluster driver tool which is attachable to a rotary tool and causes a threaded end of the baluster to be rotated into a sill plate or stair tread, and to a method of using the driver tool.

2. Background Information

Railings are typically constructed as safety features along staircases and on upper floor landings or balconies. The railings generally have a hand rail and shoe rail which lie parallel to each other and are connected together by a series of spaced apart, vertical balusters. A newel post is provided at one end of the railing. The shoe rail may be replaced with another lower support such as a sill plate or stair tread.

The prior art has disclosed a number of ways of connecting balusters to a lower support such as a shoe rail. For example, U.S. Pat. No. 4,403,767, issued to Basey, discloses a series of socket members provided at intervals along a channel in the hand and shoe rail. The socket members receive complementary shaped plugs mounted onto the ends of the balusters. When a baluster is to be connected to the rail, the plug is inserted into a socket and the baluster is pushed downwardly until the flanges on the plug interlock with the shoulders in the socket. The remaining balusters are similarly snap-fitted into the shoe rail. The hand rail is then brought into contact with the free ends of the balusters in such a manner that the plugs engage the corresponding sockets. The hand rail is pushed downwardly so that the plugs snap into connection with the sockets. A problem associated with this type of construction is that the plugs and sockets are made from polyvinyl chloride. The components must therefore be purchased and installed on the hand rail, shoe rail and on both ends of each baluster. This adds to both the time and cost of building the railing.

U.S. Pat. No. 5,557,893, issued to Bowls, shows another manner of attaching balusters to hand and shoe rails. The rails are provided with a narrow channel and a connector member is mounted on each end of the balusters. The connector member includes a thin plate that is shaped to be received into the narrow channel of one of the rails. When the carpenter is building the railing, the thin plates are slid into the channels of the hand and shoe rails and is then fastened into place. This type of connector and method of installation is time consuming and adds to the cost of building the railing.

U.S. Pat. No. 4,352,485, issued to Basey, shows a baluster connected to the hand and shoe rails by means of an externally threaded dowel provided at the upper and lower ends of the baluster. The dowels are received in holes in the baluster and the hand and shoe rails. An adhesive may be applied to the dowel and/or hole to secure the dowel within the hole. The threads increase the surface area for adhesive to bond the baluster to the rail. The dowel is inserted into the baluster and the baluster is then pushed downwardly into contact with the rail.

Basey discloses in U.S. Pat. No. 4,533,121, that the dowels for connecting the balusters to the hand or shoe rails may be made of a material which allows the dowel to be permanently deformed once bent. This allows the carpenter to move the baluster into the required position without the dowel exerting undue force on the rest of the components. Again the dowel is inserted into the baluster and the baluster is pushed downwardly into contact with the rail.

U.S. Pat. No. 4,505,456, to Zieg, discloses the use of a corresponding socket and pivot system to connect a baluster to a hand or shoe rail. A plurality of sockets are formed along the underside of the hand rail or in the upper surface of the shoe rail. The baluster has an arcuate pivot member formed on at least one end and the pivot is sized to be received within the socket of the rail.

Another method of connecting a baluster to a hand or shoe rail is providing a two-sided lag bolt which is threaded at both ends but in opposite directions. One end of the lag bolt is connected to the baluster and the other end is inserted into a pilot hole in the lower support member. The baluster is then rotated about its longitudinal axis to drive the second end of the lag bolt into the support member. The baluster is rotated until the lower surface of the baluster abuts the upper surface of the support member. Alternatively, the end of the baluster may be externally threaded and be adapted to engage a complementary-shaped threaded hole in the lower support. The baluster is again rotated by hand so that the threaded end screws into the threaded hole. A railing is constructed by first connecting a number of balusters to the lower support member, and then connecting the free ends of the balusters to a hand rail by a suitable mechanism. This type of installation is relatively cost effective. The problem with this type of installation is that hand rotation of the balusters is time consuming and physically tiring when a large railing is being constructed. It is to this type of baluster/rail connection method that the present invention is directed.

There is a need in the art to provide a quick and easy method and apparatus for installing balusters that are rotated into connection with their lower support member.

SUMMARY OF THE INVENTION

The device of the present invention is a driver tool that is adapted to receive the end of a baluster therein. The tool holds the end of the baluster sufficiently securely to cause the baluster to rotate when the driver rotates. The driver is attachable to the chuck of a hand-held drill and is caused to rotate by the drill. As the driver rotates, it causes rotation of the baluster, thereby driving the lag bolt or threaded end into the shoe rail.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

DETAILED DESCRIPTION OF THE INVENTION

Figure 1:
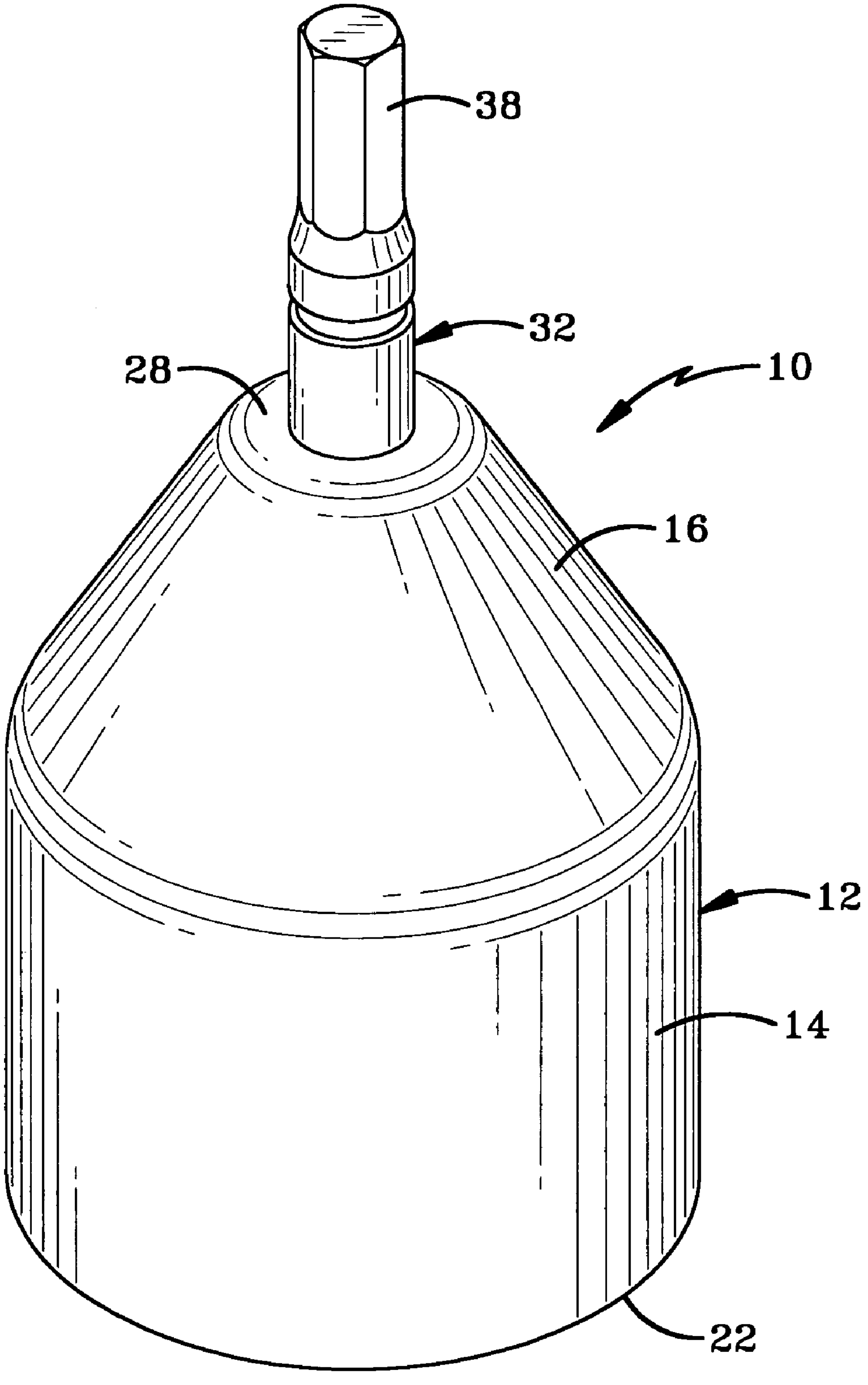
FIG. 1 is a perspective view of a baluster driver tool in accordance with the present invention, where the tool is shown with a drive shaft attached thereto to connect the driver tool to a drill.
Figure 2:
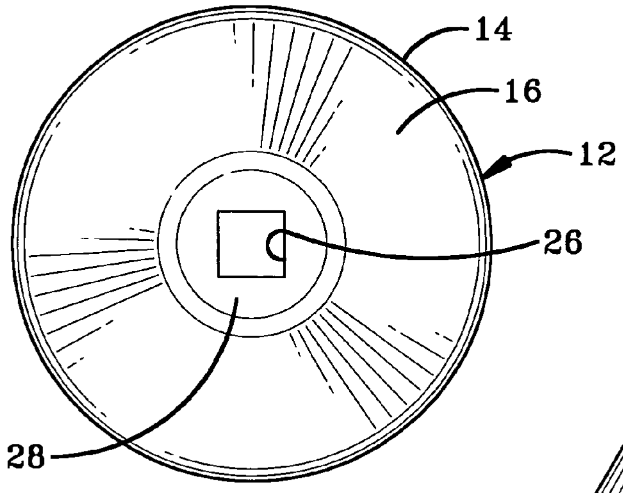
FIG. 2 is a top view of the baluster driver tool of FIG. 1 with the drive shaft removed therefrom.
Figure 3:
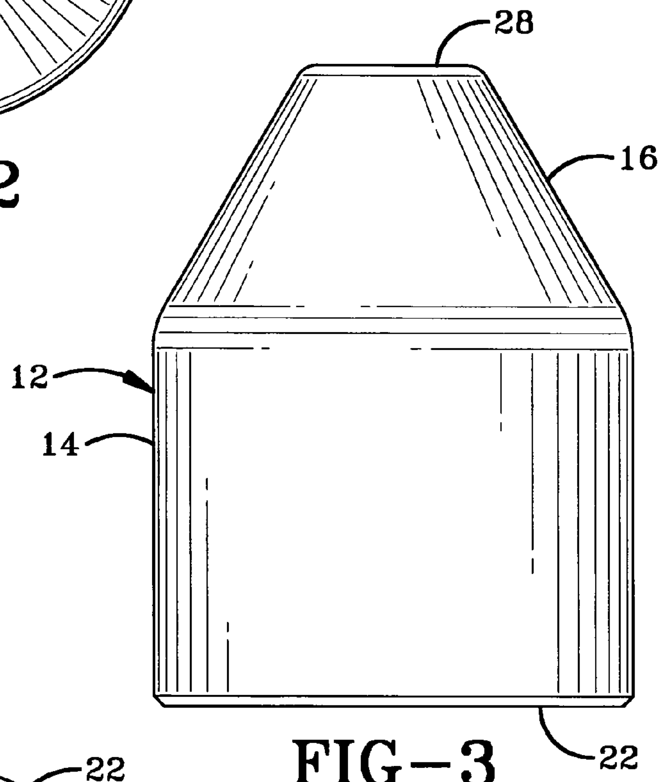
FIG. 3 is a side view of the baluster driver tool of FIG. 2.
Figure 4:
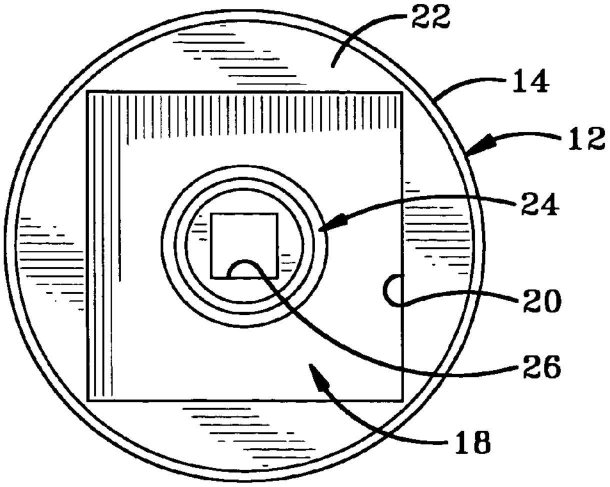
FIG. 4 is a bottom view of the baluster driver tool.
Figure 5:
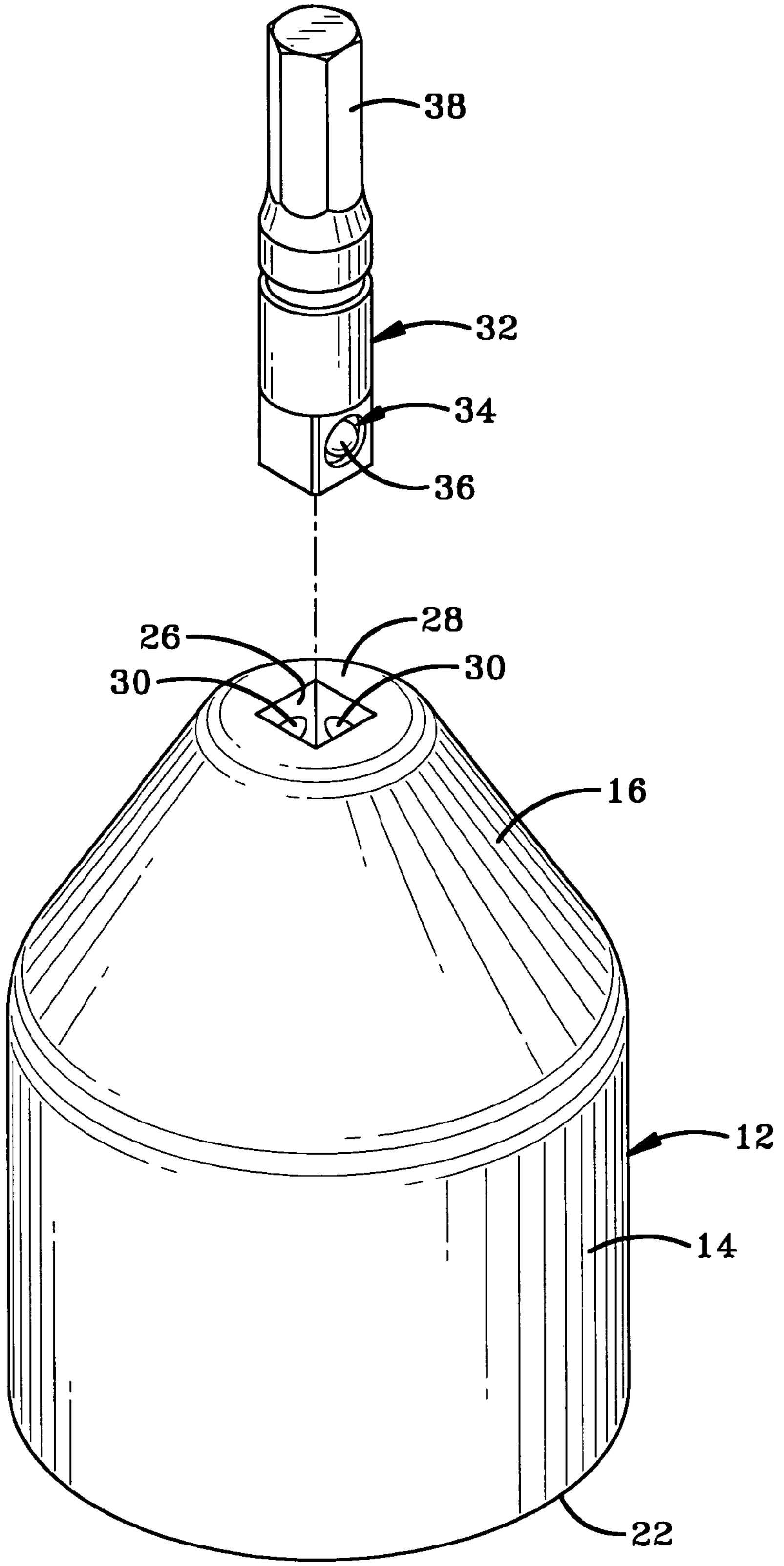
FIG. 5 is an exploded perspective view of the baluster driver tool showing the drive shaft being inserted into the housing.
Figure 8:
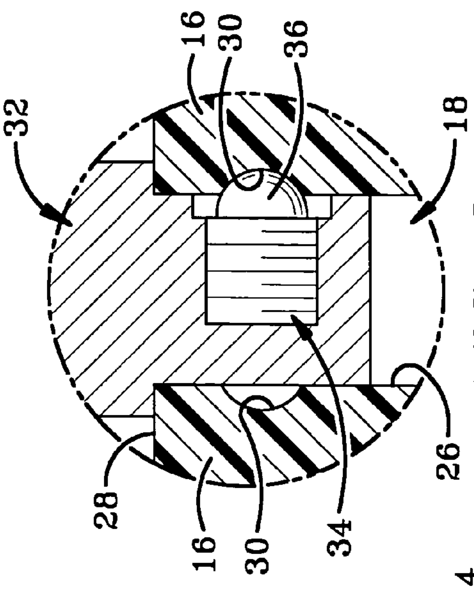
FIG. 8 is a magnified view of the encircled area of FIG. 7.
Figure 7:
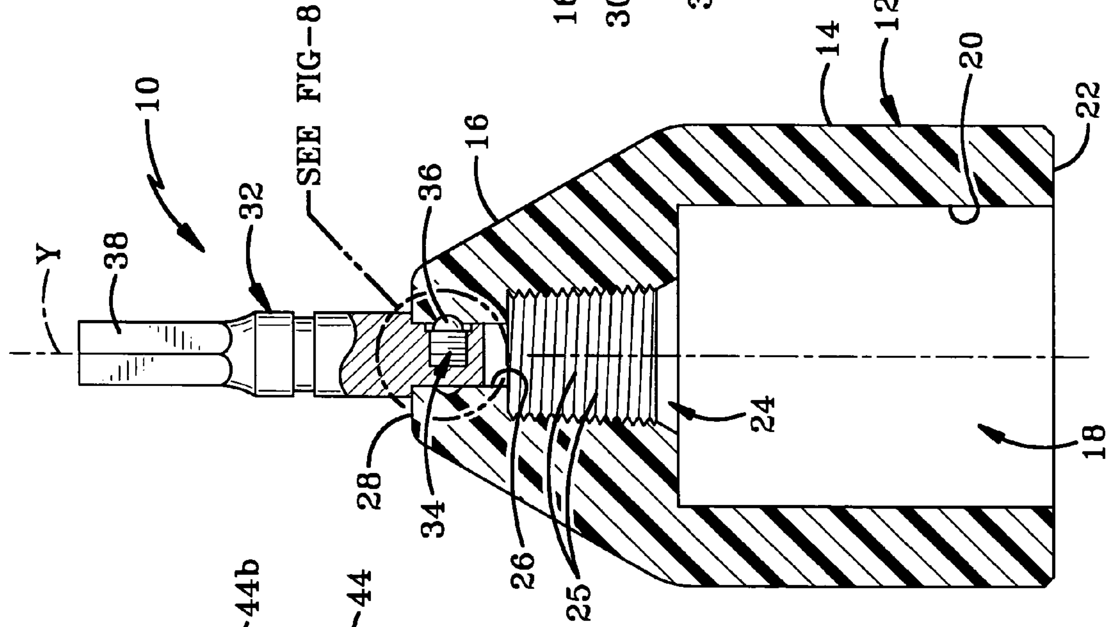
FIG. 7 is a cross-sectional side view of the baluster driver tool with the drive shaft attached thereto.
Figure 6:
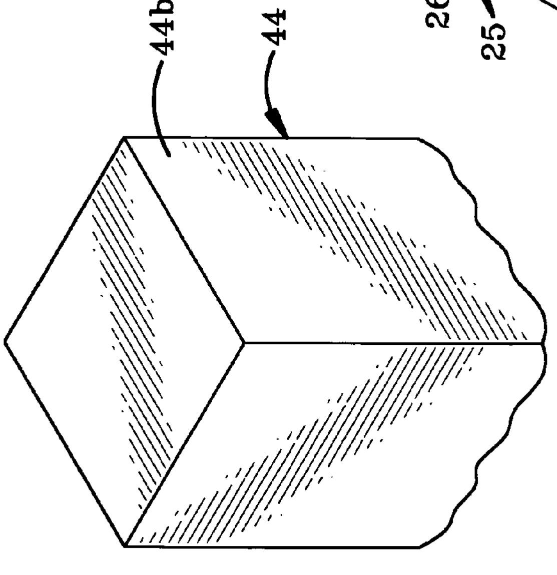
FIG. 6 is a fragmentary perspective view of the upper end of a baluster that has a square cross-sectional shape.
Figure 10:
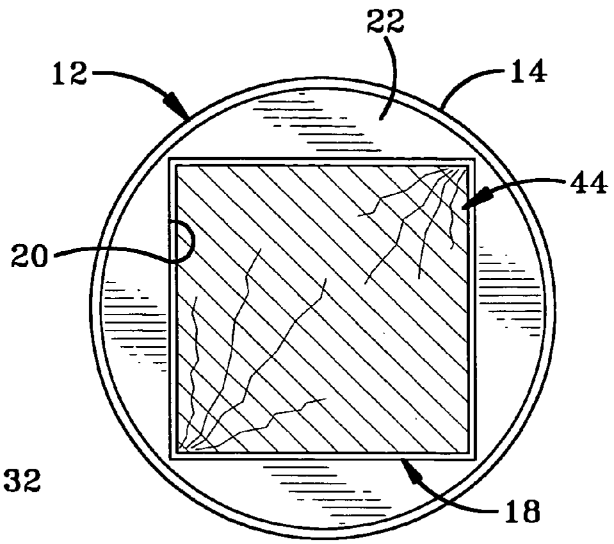
FIG. 10 is a sectional view of the baluster driver tool taken on line 10-10 of FIG. 9.
Figure 9:
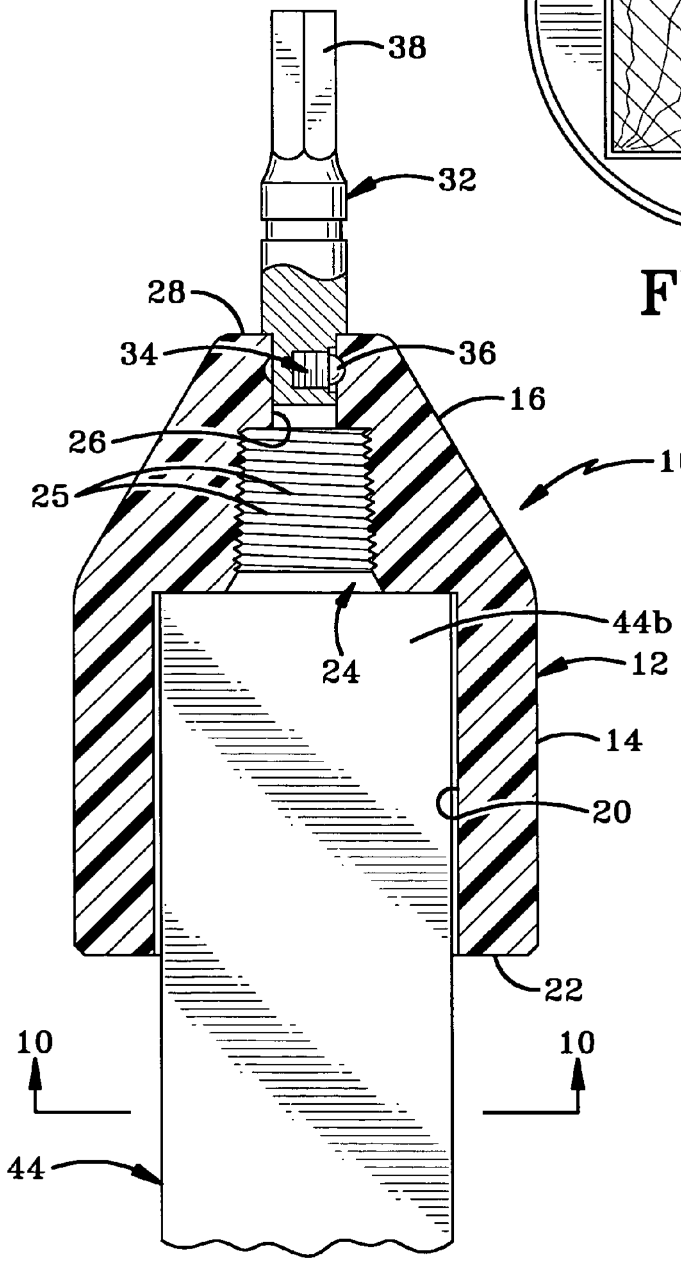
FIG. 9 is a cross-sectional side view of the baluster driver tool engaged with a baluster that has a square cross-sectional shape and an end wall that lays normal to its side walls.

The baluster driver tool of the present invention is indicated generally at 10, and is shown particularly in FIGS. 1-10. Driver tool 10 includes a housing, generally indicated at 12, having a first generally cylindrical portion 14 and a second generally frusto-conical shaped portion 16. Housing 12 preferably is manufactured from a strong durable material such as steel or aluminum. Housing 12 is formed with a central, axially extending bore 18 having an enlarged rectangular-shaped cavity 20 disposed in portion 14 adjacent a first end 22 thereof, an internally threaded reduced diameter tapered cavity 24 disposed in portion 16, and a reduced generally rectangular opening 26 proximate a second end 28 of housing 12. The longitudinal axis "Y" (FIG. 7) extends between ends 22 and 28 of housing 12. Cavity 20 is generally square in cross-section, tapered cavity 24 is circular in cross-section and opening 26 is square in cross-section. As may be most clearly seen from FIG. 7, cavity 20 has a width that is greater than the maximum diameter of cavity 24. Cavity 24 is of maximum diameter proximate cavity 20. Cavity 24 has a minimum diameter proximate opening 26 and that minimum diameter is greater than the width of opening 26. Opening 26 is formed with a plurality of indentations 30 and receives a complementary shaped drive shaft 32 which is mounted therein by a spring-biased ball detent 34. A spherical ball 36 thereof is adapted to be received within indentation 30 for snap-fit mounting of shaft 32 in second end 28 of driver tool 10. The opposite end 38 of shaft 32 is multi-sided and is adapted to be received within a driving tool, such as a chuck 40 of a drill 42, as shown in FIG. 11.

Figure 11:
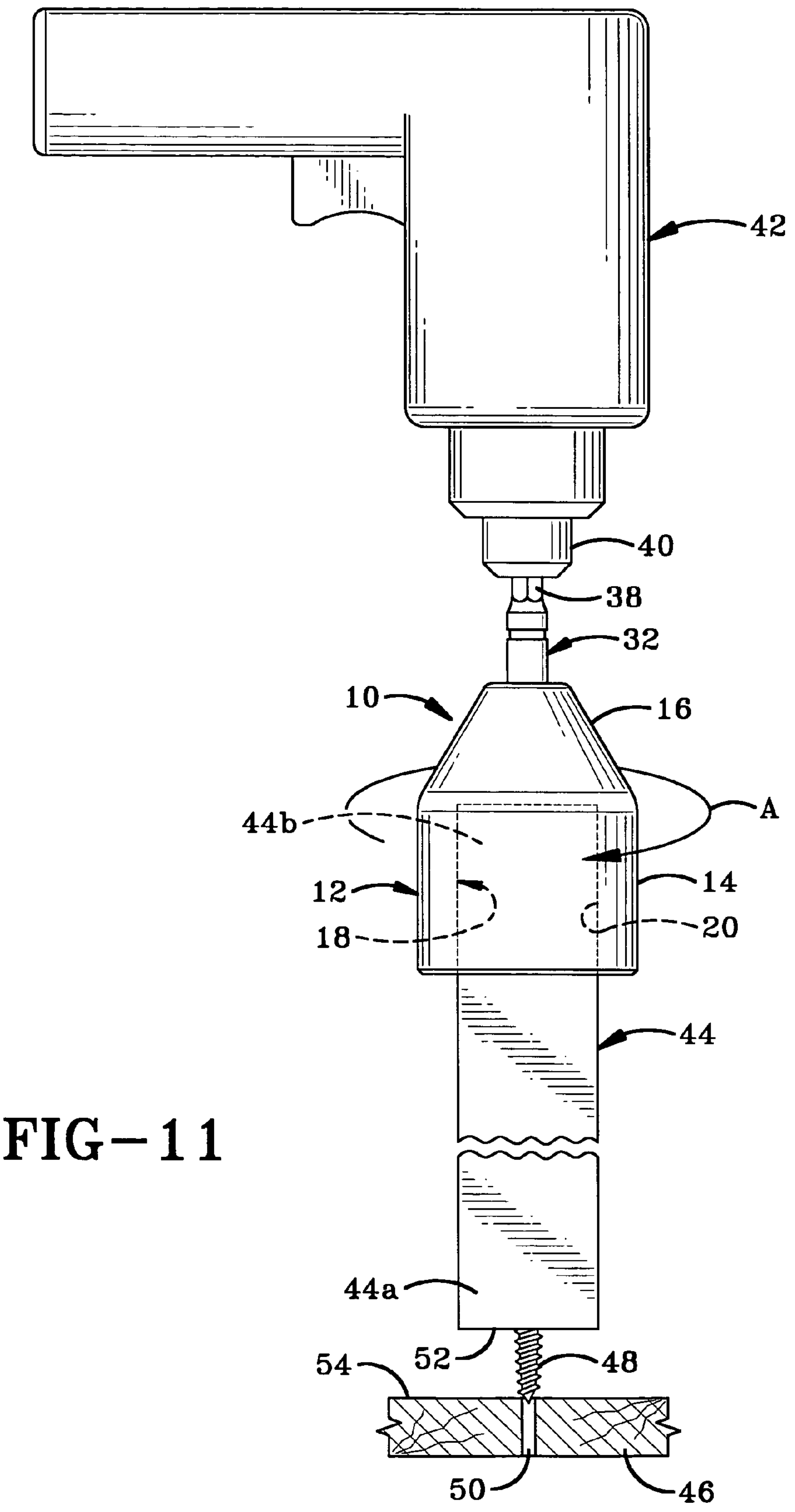
FIG. 11 is a side view of the baluster driver tool connected to a hand-held drill installing a baluster on a support member.
Figure 12:
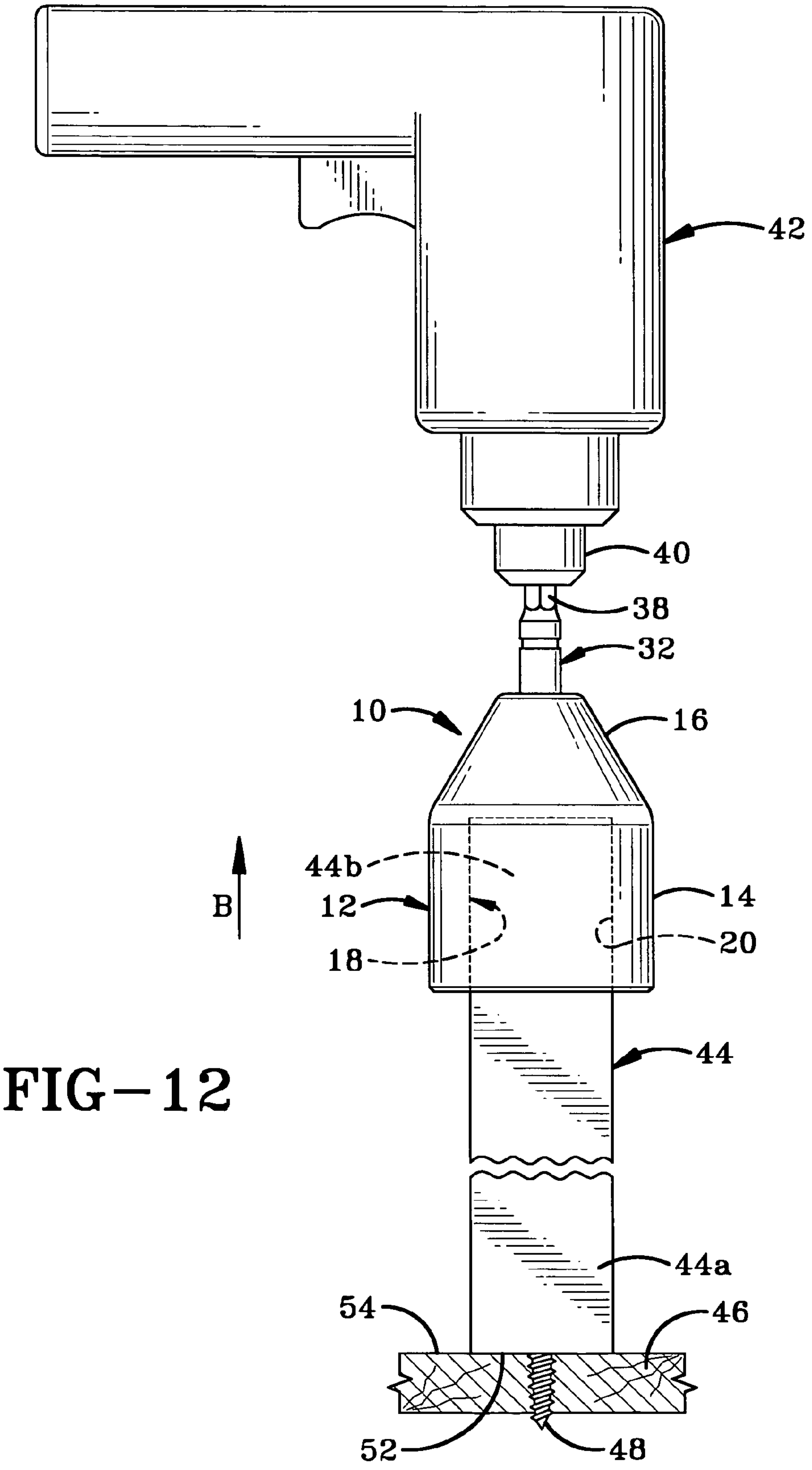
FIG. 12 is a side view of the baluster driver tool showing the baluster mounted on the support member.
Figure 13:
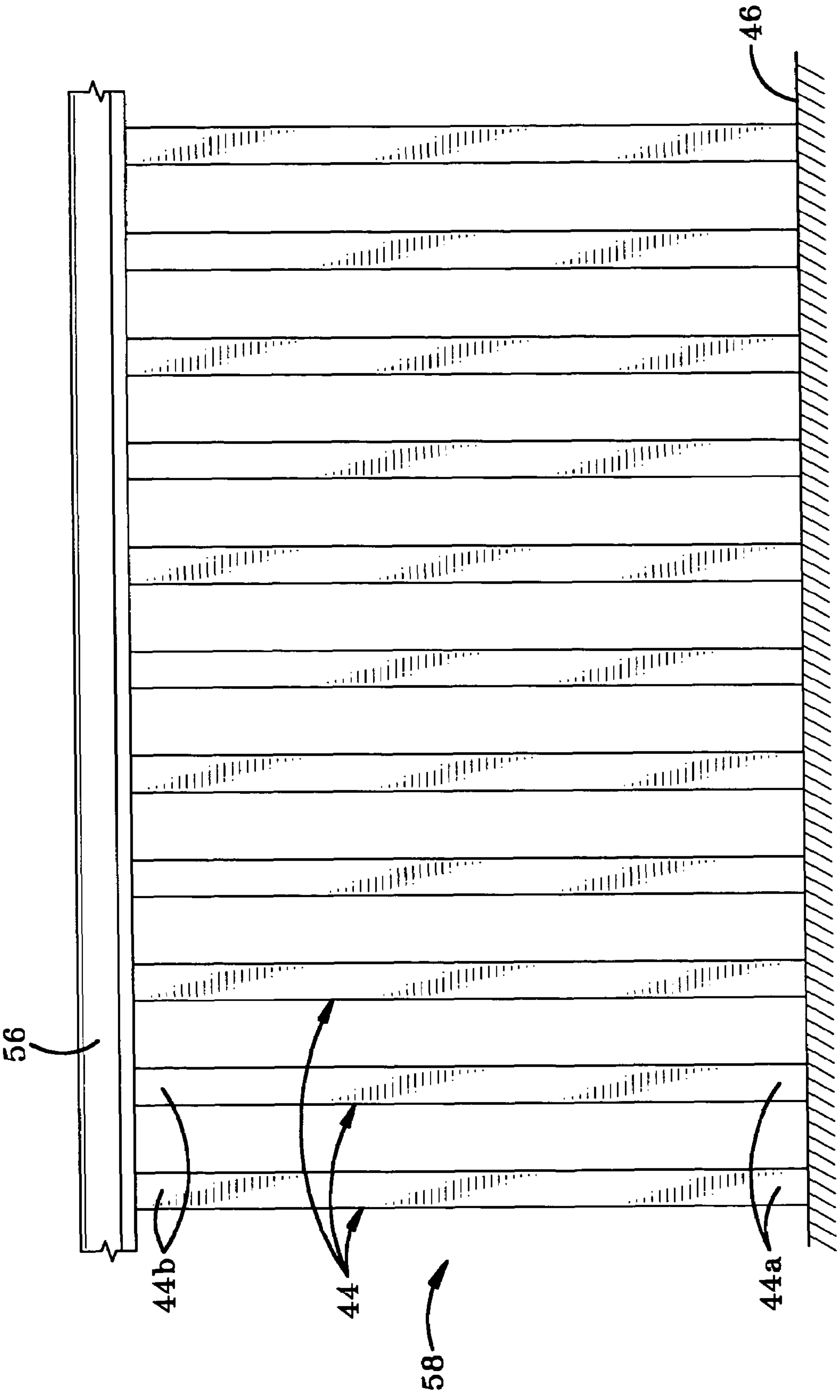
FIG. 13 is a side view of a railing showing a number of balusters connected between a lower support member and a hand rail.
Figure 18:
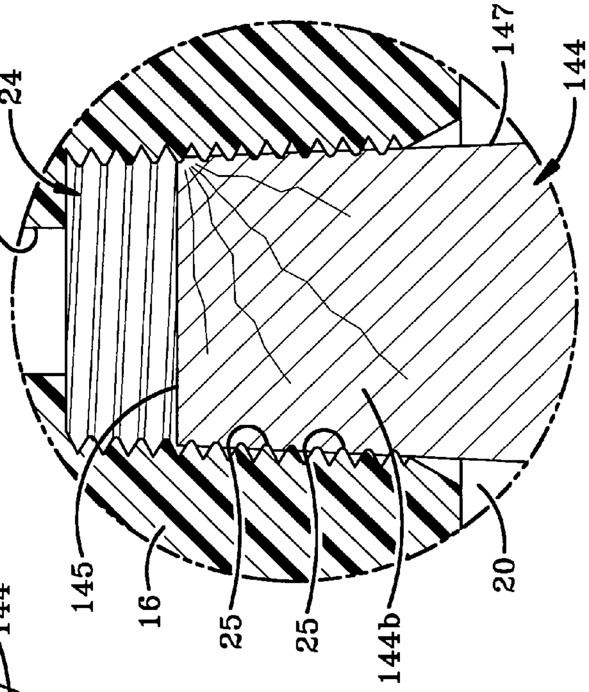
FIG. 18 is a magnified view of the encircled area in FIG. 16.
Figure 17:
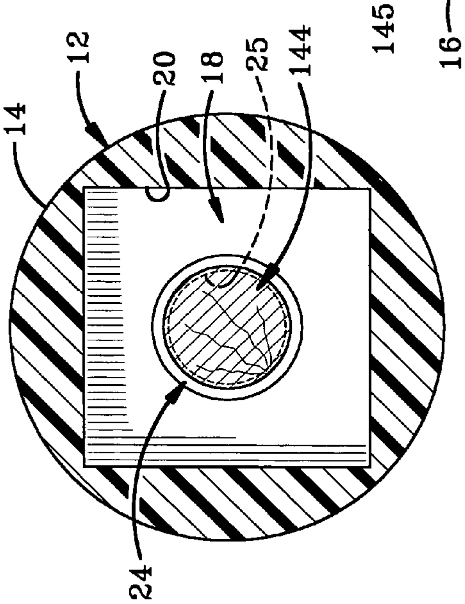
FIG. 17 is sectional view of the baluster driver tool taken on line 17-17 of FIG. 16.
Figure 14:
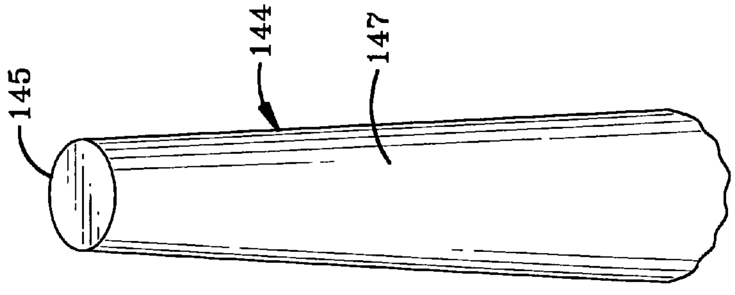
FIG. 14 is a perspective view of the upper end of a second baluster having a circular cross-sectional shape.
Figure 15:
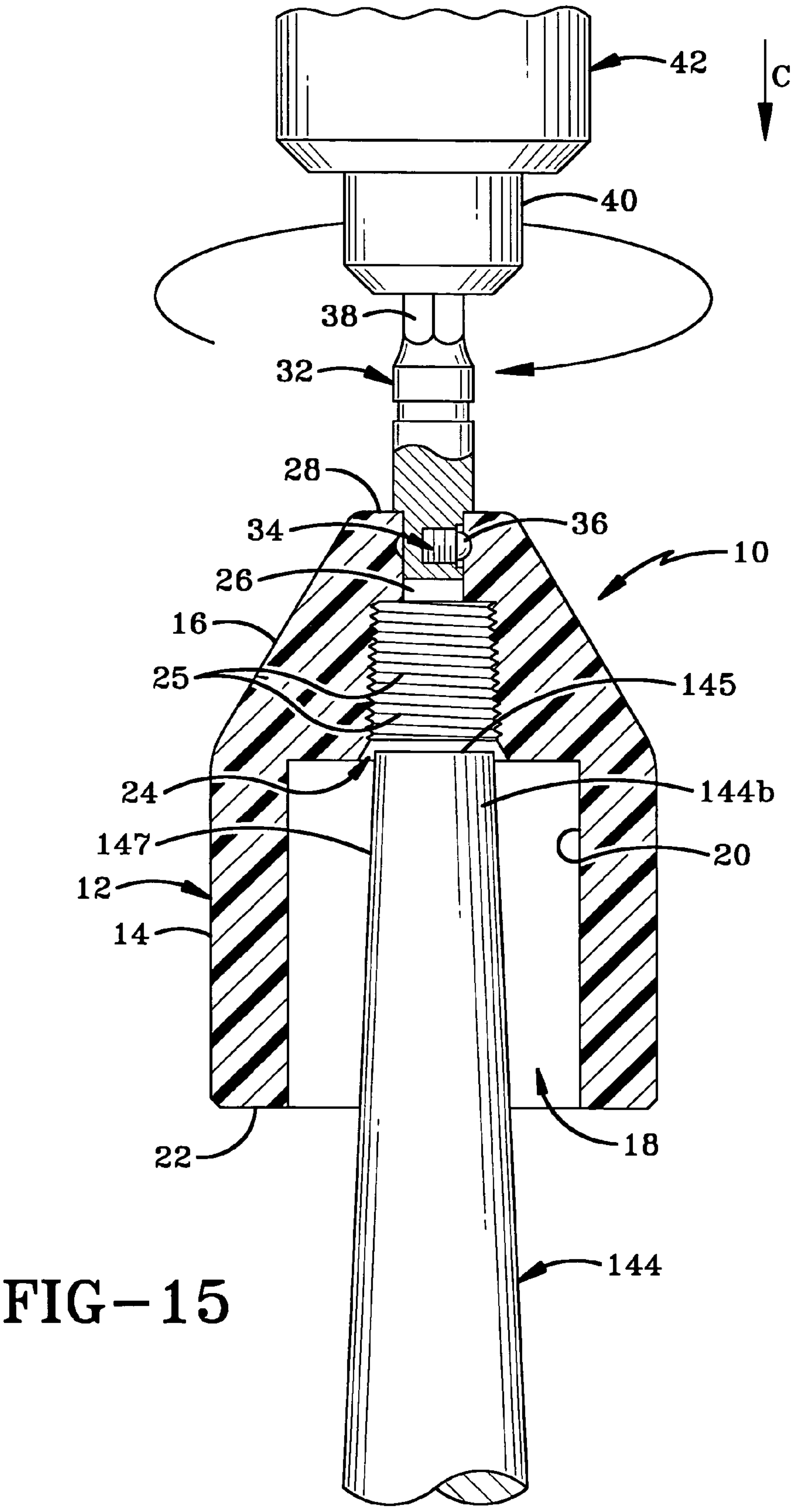
FIG. 15 is a partial cross-sectional side view of the baluster driver tool in position for engaging the second baluster.
Figure 16:
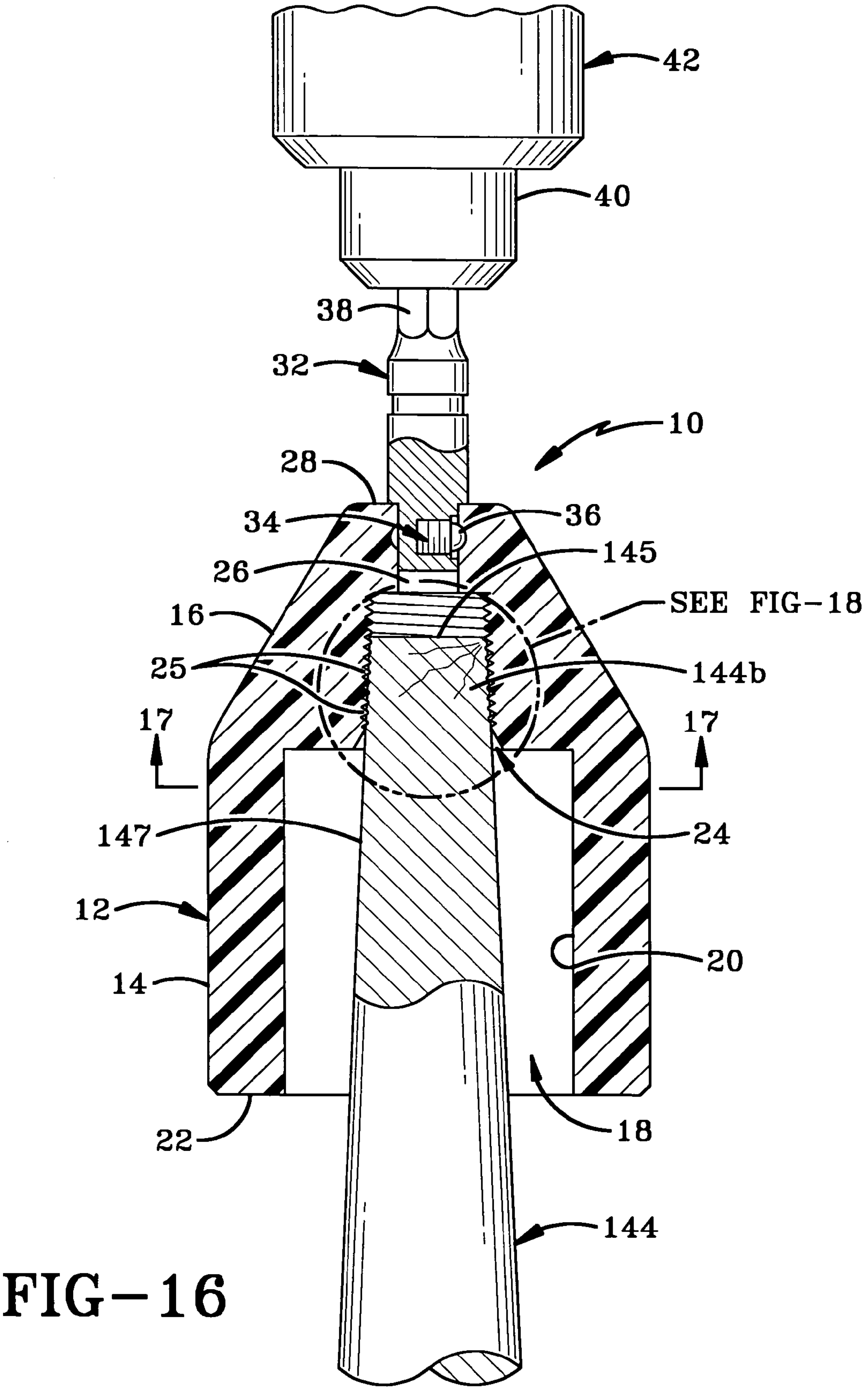
FIG. 16 is a partial cross-sectional side view of the baluster driver tool showing the upper end of the second baluster engaged in the cavity of the driver tool.

Referring to FIGS. 11-13, driver tool 10 may be used to connect a baluster 44 of square cross-section to a support member 46, such as a sill plate or stair tread. Baluster 44 is provided with a two-sided lag bolt 48 at a first end **44*a* thereof to connect it to support 46. A pilot hole 50 is drilled into support 46 to ensure that baluster 44 is correctly positioned and to reduce the tendency of support 46 to crack as lag bolt 48 is screwed therein. Drive shaft 32 is inserted into opening 26 of housing 12 until ball 36 engages in an indentation 30. End 38 of drive shaft 32 is secured to chuck 40 of drill 42. A second end 44*b* of baluster 44 is inserted into bore 18. As both cavity 20 of housing 12 and baluster 44 are of square cross-section, the second end 44*b* of baluster 44 is retained within cavity 20 of housing 12**.

Drill 42 is activated causing drive shaft 32 to be rotated about its longitudinal axis. This rotation of drive shaft 32 causes housing 12 and baluster 44 to rotate about their longitudinal axes as illustrated by arrow "A" in FIG. 11. As baluster 44 rotates, lag bolt 48 is screwed into support 46. When the surface 52 of baluster 44 abuts the surface 54 of support 46, as shown in FIG. 12, drill 42 is switched off and the rotation of the various components ceases. Drill 42 is moved in the direction of arrow "B" (FIG. 12) and second end **44*b* of baluster 44 slides out of bore 18. This process is repeated until a plurality of balusters 44 are inserted into support 46. A handrail 56 is then secured to second ends 44*b* of balusters 44 in the conventionally known way so that a railing, generally indicated at 58**, is produced.

Driver tool 10 may also be used to install balusters having a circular cross-section, such as that shown in FIGS. 14-18, where the baluster is generally indicated at 144. Second end **144*b* of baluster 144 is smooth and tapered and the first end (not shown) is threaded. Housing 12 is positioned over second end 144*b* and second end 144*b* is inserted through cavity 20 and into cavity 24 until the uppermost edge 145 becomes wedged in cavity 24. Drill 42 is activated so that housing 12 rotates about its longitudinal axis. First end (not shown) of baluster 144 is brought into contact with the surface (not shown) to which it is to be attached. As drill 42 is moved in the direction of arrow "C" (FIG. 15), uppermost edge 145 of baluster 144 is driven further into cavity 24 and threads 25 bite into the smooth outer surface 147 of baluster 144 securing baluster 144 and housing 12 together. First end (not shown) of baluster 144 is threadably engaged with support (not shown) as housing 12 is rotated by drill 42**.

Figure 21:
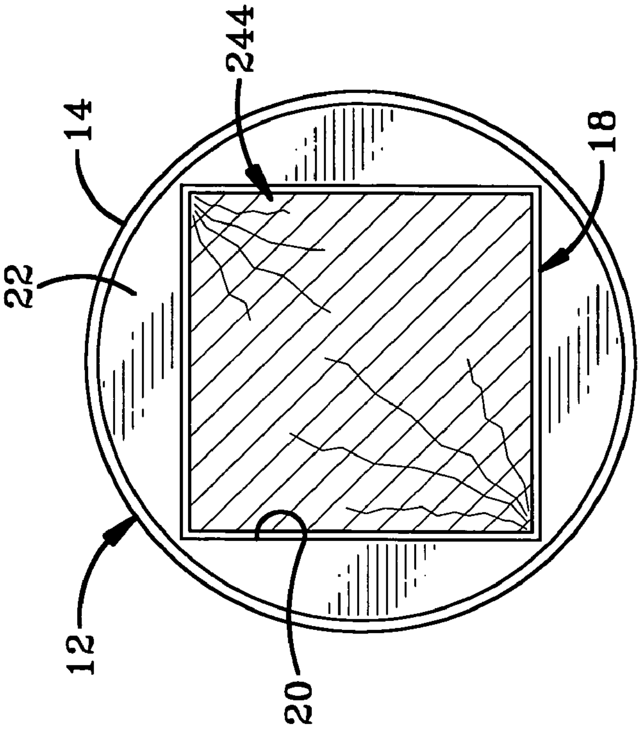
FIG. 21 is a sectional view taken on line 21-21 of FIG. 20.
Figure 19:
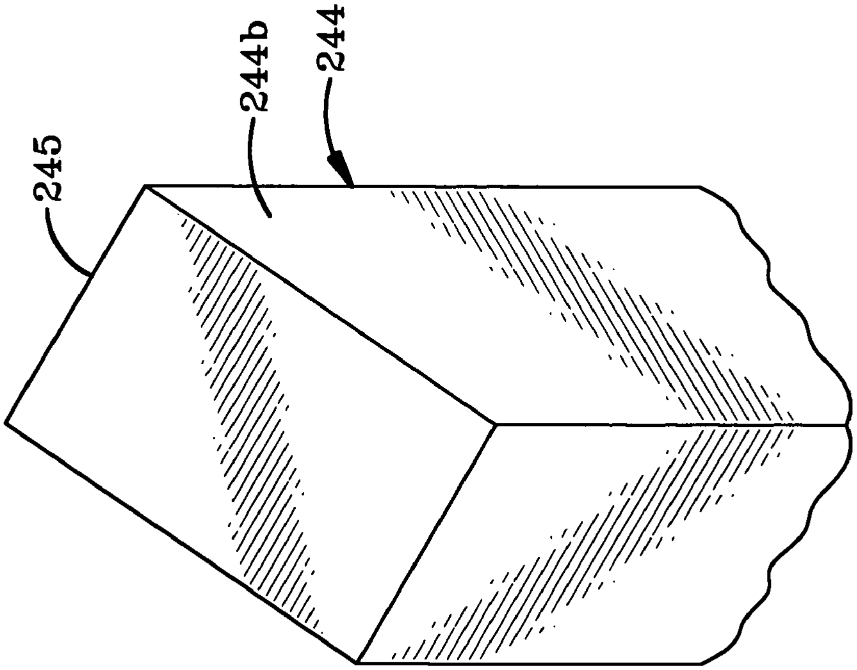
FIG. 19 is a fragmentary perspective view of a baluster having a sloped upper end and a square cross-sectional shape.
Figure 20:
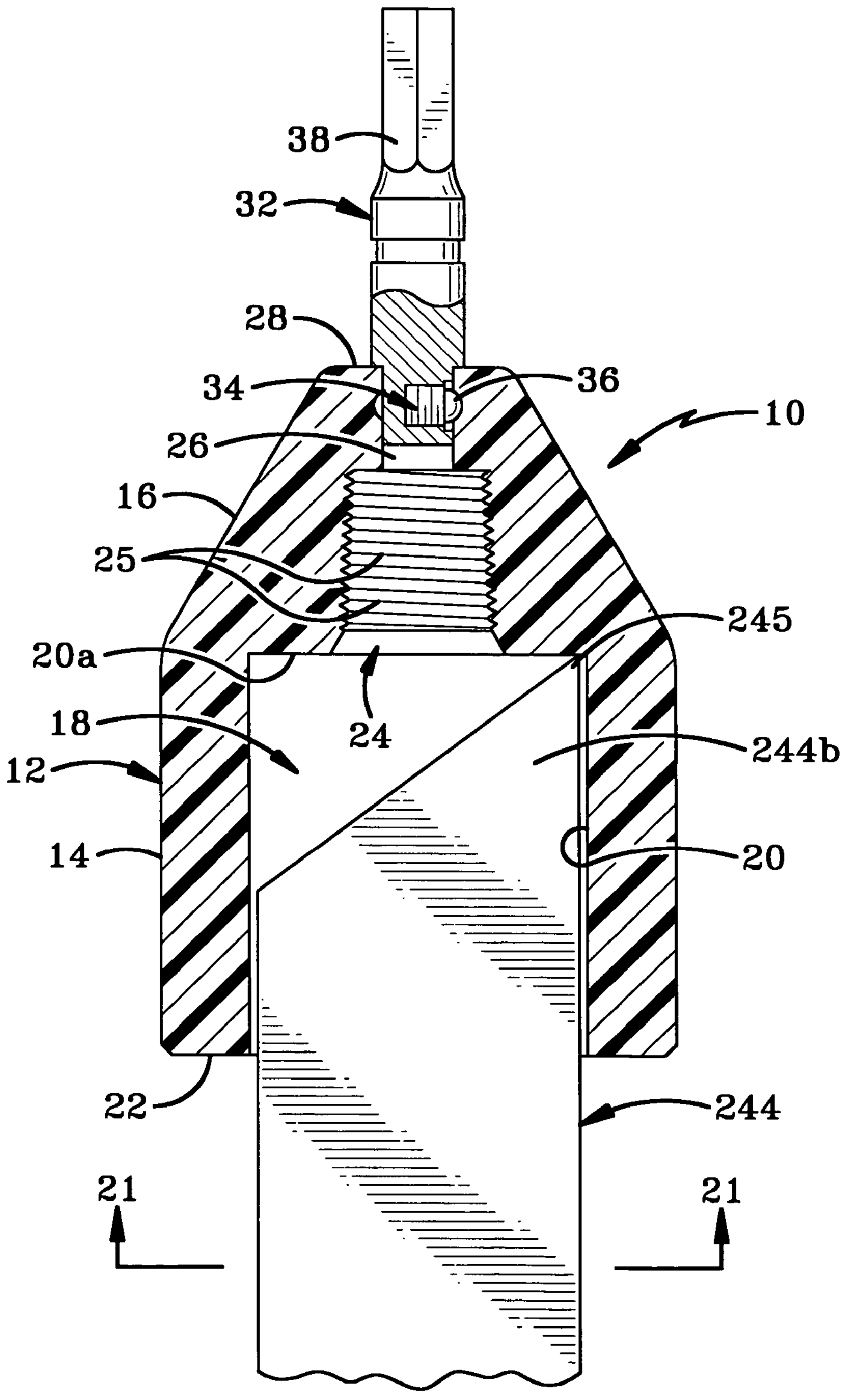
FIG. 20 is a partial cross-sectional side view of the baluster of FIG. 19 engaged in the baluster driver tool.
Figure 22:
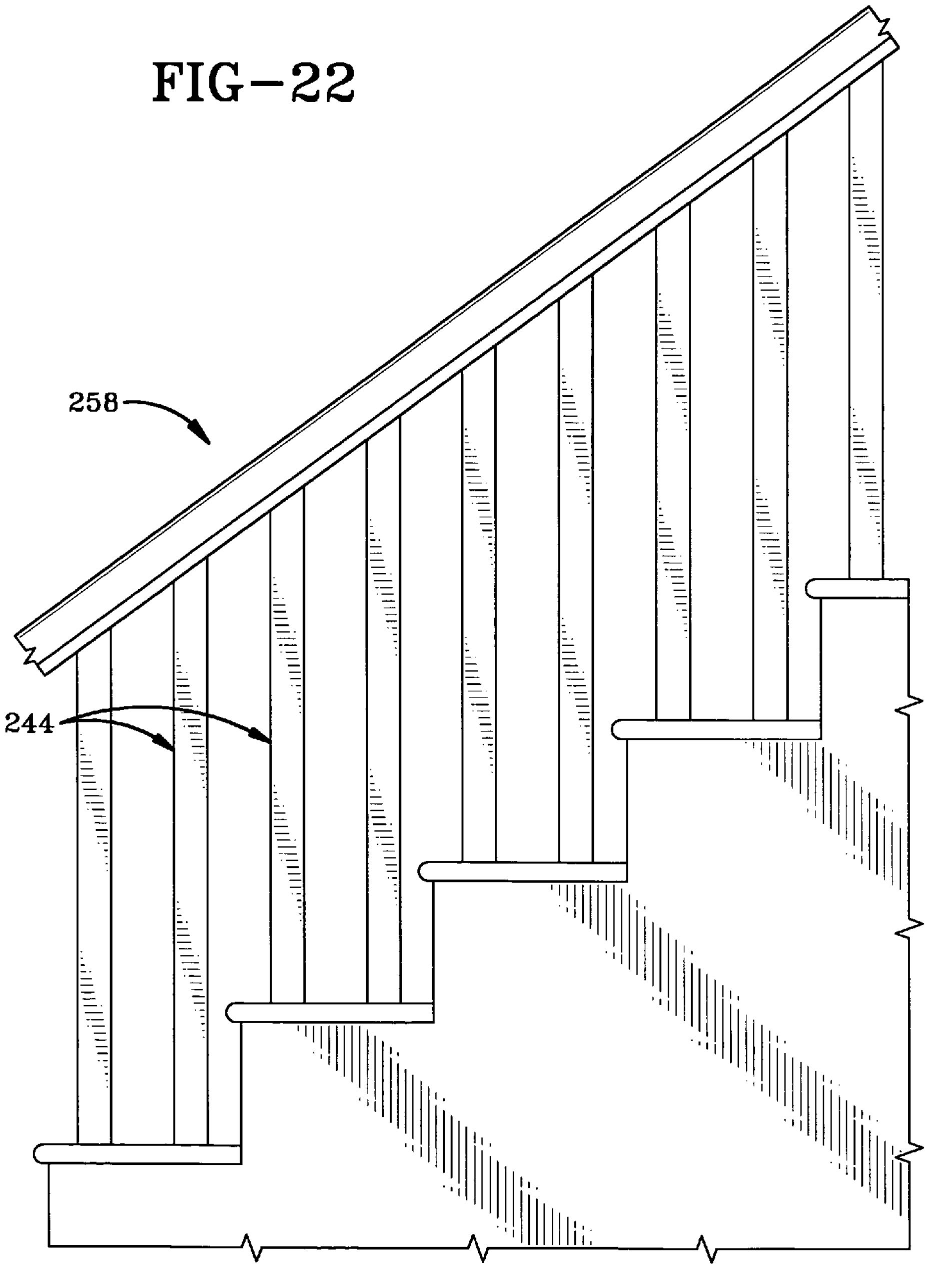
FIG. 22 is a side view of a plurality of balusters connected between stair treads and the hand rail on a staircase.

Driver tool 10 may also be used to install balusters that are square in cross-section but which have a wedge-shaped second end as is shown by baluster 244 in FIGS. 19-21, and which are used to form stair railings 258 (FIG. 22). The second end **244*b* of baluster 244 is inserted into bore 18 until tip 245 of baluster 244 engages end wall 20*a* of cavity 20. Baluster 244 rotates with housing 12 as cavity 20 and baluster 244** are complementary in cross-sectional size and shape.

It will be understood that various modifications may be made to driver tool 10 without departing from the spirit of the present invention. For instance, instead of one or more indentations 30 being provided in opening 26, a groove may be provided to engage spring-biased ball 36 of drive shaft 32. Alternatively, the spring biased detent may be provided in opening 26 and the indentation or groove may be provided on the drive shaft 32. Other types of mechanisms may be utilized for connecting the drive shaft to the housing, such as providing aligned holes in both components and the use of a cotter pin to connect them together. Alternatively, the drive shaft may be integrally formed with the housing 12.

Other variations in the driver tool 10 may include the provision of a bore 18 that comprises only one of the cavities 20 or 24, instead of both cavities 20 and 24 as shown in the preferred embodiment of the invention. Furthermore, while opening 26 is shown as being continuous with cavity 24, it may be formed as a discrete cavity that is not continuous with cavity 24. Additionally, threads or ridges may be provided in cavity 20 and other baluster-engaging mechanisms may be provided in cavity 24 instead of threads 25. Furthermore, while cavity 20 has been shown to be square in cross-section, it will be understood that cavity 20 need only have at least one straight wall or projection to engage baluster 44 to cause it to rotate with housing 12. Furthermore, opening 26 need not be square in cross-section, it may be of any other cross-sectional configuration that is complementary sized and shaped to any other cross-sectionally shaped drive shaft. It will be understood that while cavity 24 is disclosed as being tapered, it may be of equal diameter along its length. Only one of the cavity 24 and baluster 144 need be tapered for driver tool 10 to be able to threadably attach baluster 144 to a support.

It will also be understood that while the driver tool 10 has been described as being useful for installing a baluster having a two-sided lag bolt mounted in one end, it can also be used to install balusters that have a threaded end and which are screwed directly into the support. It will also be understood that the external shape of housing 12 may be completely cylindrical or of any other desired shape.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A baluster driver tool for connecting a baluster to a support comprising:

- a housing having a first and a second end and a longitudinal axis extending therebetween;
- a connector disposed on the first end of the housing and adapted to connect the housing to a power tool for rotating the housing about the housing's longitudinal axis; and
- a baluster-engaging member provided on the second end of the housing and adapted to engage an end of the baluster, said baluster-engaging member including:
  - a first central, axially extending cavity that is sized and shaped to receive the end of the baluster therein; and
  - a second cavity formed in the housing and extending substantially continuously with the first cavity; and wherein the first cavity has at least one straight wall and the second cavity is substantially circular in cross-section; and wherein the second cavity is provided with a baluster-engaging mechanism for securing the baluster in the second cavity; whereby rotation of the housing about the longitudinal axis causes the baluster to rotate and become attached to the support.

2. The baluster driver tool of claim 1, wherein the baluster-engaging mechanism is threads.

3. The baluster driver tool of claim 1, wherein the first cavity has a width and the second cavity has a maximum diameter, and the width of the first cavity is greater than the maximum diameter of the second cavity.

4. The baluster driver tool of claim 3, wherein the second cavity tapers from the maximum diameter proximate the first cavity to a minimum diameter remote from the first cavity.

5. The baluster driver tool of claim 1, wherein the connector includes:

- an opening formed in the first end of the housing; and
- a drive shaft having a first end complementary sized and shaped to be received in the opening; and a second end adapted to engage the power tool.

6. The baluster driver tool of claim 5, wherein the connector further includes:

- a locking mechanism for security the drive shaft within the opening.

7. The baluster driver tool of claim 6, wherein the locking mechanism includes:

- a projection formed on one of the drive shaft and a wall in the housing defining the opening;
- an indentation formed on one of the drive shaft and the opening wall; and
- wherein the projection and the indentation are complementary sized and shaped so the projection is receivable within the indentation.

8. The baluster driver tool of claim 7, wherein the projection is spring-biased and is movable between a first position where the drive shaft freely enters and exits the opening, and a second position where the drive shaft is locked in the opening.

9. The baluster driver tool of claim 5, wherein the baluster-engaging member comprises:

- a first central, axially extending cavity of generally square cross-section; the first cavity having a width; and
- a second central, axially extending cavity of generally circular cross-section, the second cavity having a maximum diameter that is smaller than the width of the first cavity; and wherein the second cavity is disposed between the first cavity and the opening and the first cavity and second cavity are substantially continuous.

10. The baluster driver tool of claim 9, wherein the first cavity, second cavity and opening are substantially continuous.

11. The baluster driver tool of claim 10, wherein the opening has a width and the second cavity has a minimum diameter and the width of the opening is bigger than the minimum diameter of the second cavity.

12. The baluster driver tool of claim 1, wherein the housing is shaped so as to be generally frusto-conical proximate its first end and generally cylindrical proximate its second end.

13. The baluster driver tool of claim 1, wherein the first cavity is square in cross-section.

14. A baluster driver tool for connecting a baluster to a support; said baluster driver tool comprising:

- a housing having a first end and a second end and a longitudinal axis extending therebetween;
- a connector disposed on the first end of the housing and adapted to connect the housing to a power tool that is activatable to rotate the housing about the longitudinal axis; wherein the connector includes:
  - an opening formed in the first end of the housing and having a width;

a drive shaft, complementary sized and shaped to be received in the opening; and a baluster engaging member provided at the second end of the housing; and wherein at least a Portion of said baluster engaging member is internally threaded and is adapted to engage an end of the baluster, whereby rotation of the housing about the longitudinal axis causes the baluster to rotate and become attached to the support; wherein the baluster-engaging member comprises:

a first central, axially extending cavity of generally square cross-section; the first cavity having a width; and a second central, axially extending cavity of generally circular cross-section disposed between the first cavity and the opening; wherein the opening and first and second cavities are substantially continuous; and wherein the second cavity has a maximum diameter and a minimum diameter, and the maximum diameter is smaller than the width of the first cavity and the minimum diameter is smaller than the width of the opening; and wherein the second cavity tapers in cross section from the maximum diameter proximate the first cavity to the minimum diameter proximate the opening.

15. The baluster driver tool of claim 14, wherein the second cavity is surrounded by a wall and at least a portion of the second cavity wall is threaded.

16. The baluster driver tool of claim 14, wherein the housing is shaped so as to be generally frusto-conical proximate its first end and generally cylindrical proximate its second end.

17. A method of connecting a baluster to a support, wherein the baluster is an elongated member having a first end and a second end and has a thread provided at the first end thereof; and the method comprises the steps of:

providing a housing having:

a connector for connecting the housing to an electrically powered tool for rotating said housing; and a baluster-engaging member for engaging the baluster; wherein the baluster-engaging member includes:

a first cavity complementary sized and shaded to receive the second end of the baluster therein;

a second cavity of different width and cross-sectional configuration to the first cavity and substantially continuous therewith; and wherein the second cavity includes an interior wall that is at least partially threaded;

connecting the housing to the tool via the connector;

engaging the second end of the baluster in the baluster-engaging member by inserting the second end of the baluster into the first cavity;

twisting the housing into contact with the second end of the baluster until the second end becomes wedged onto the threads on the interior wall of the second cavity; positioning the thread of the first end of the baluster on the support: and supplying electrical power to the tool to activate the same and to thereby rotate the housing and baluster to threadably connect the first end of the baluster to the support.

18. The method as defined in claim 17, wherein the housing includes an opening formed therein and the step of connecting the housing to a rotary tool includes:

inserting a first end of a complementary sized and shaped drive shaft into the opening; and locking the first end of the drive shaft into the housing so that the housing and drive shaft are connected together for rotational movement about the longitudinal axis of the housing.

19. The method as defined in claim 18, wherein the step of locking the drive shaft in the opening includes the step of:

providing an indentation on one of the drive shaft and a wall surrounding the opening;

providing a complementary shaped and sized projection on the other of the drive shaft and the wall; and sliding the drive shaft into the opening until the projection becomes engaged in the indentation.

20. The method as defined in claim 19, further comprising the steps of:

inserting a second end of the drive shaft into a chuck of a drill; and securing the second end of the drive shaft within the chuck.

* * * * *